(12) United States Patent
Takezawa et al.

(10) Patent No.: US 6,619,800 B1
(45) Date of Patent: Sep. 16, 2003

(54) PROJECTOR COMPRISING A POLARIZER ATTACHED TO A TRANSMISSIVE FLEXIBLE PLATE MATERIAL THAT BENDS RESPONSIVE TO CHANGES IN THE SHAPE OF THE POLARIZER

(75) Inventors: Takeshi Takezawa, Matsumoto (JP); Nobuo Watanabe, Shrojiri (JP); Hidemasa Yamakawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 09/612,523

(22) Filed: Jul. 6, 2000

(30) Foreign Application Priority Data

Jul. 23, 1999 (JP) .......................................... 11-209533

(51) Int. Cl.[7] .................... G03B 21/14; G03B 21/00; G02F 1/1335; G02F 27/28
(52) U.S. Cl. ..................... 353/20; 353/31; 349/96; 359/500
(58) Field of Search ................ 353/20, 31, 34, 353/37; 349/96; 359/500, 242, 245, 246, 490, 491, 492

(56) References Cited

U.S. PATENT DOCUMENTS

| | | | | |
|---|---|---|---|---|
| 4,318,958 A | * | 3/1982 | Piatt | 428/332 |
| 4,928,123 A | | 5/1990 | Takafuji | 353/20 |
| 5,486,942 A | * | 1/1996 | Ichikawa et al. | 359/83 |
| 5,651,599 A | | 7/1997 | Fujimori et al. | 353/61 |
| 5,841,501 A | * | 11/1998 | Eiraku et al. | 349/150 |
| 5,909,259 A | | 6/1999 | Ishino | 349/9 |
| 6,050,494 A | * | 4/2000 | Song et al. | 235/492 |
| 6,160,663 A | * | 12/2000 | Merrill et al. | 359/500 |
| 6,262,787 B1 | * | 7/2001 | Kamoi et al. | 349/96 |

FOREIGN PATENT DOCUMENTS

| | | | |
|---|---|---|---|
| CN | 1122910 A | 5/1996 | G01M/11/02 |
| CN | 1170144 A | 1/1998 | G02F/1/1335 |
| EP | 0 825 473 A2 | 2/1998 | G02B/27/10 |
| JP | 4-213445 A | 8/1992 | G03B/21/132 |
| JP | A 10-39139 | 2/1998 | G02B/5/30 |
| JP | A 10-48590 | 2/1998 | G02F/1/13 |
| JP | A 10-325954 | 12/1998 | |
| JP | 10325954 | 12/1998 | G02F/1/1335 |
| JP | 10-325954 A | 12/1998 | G02F/1/1335 |
| JP | 11133395 | 5/1999 | G02F/1/333 |

* cited by examiner

Primary Examiner—Russell Adams
Assistant Examiner—Melissa J. Koval
(74) Attorney, Agent, or Firm—Oliff & Berridge, PLC.

(57) ABSTRACT

A projector includes an illumination system for emitting illumination light, an electro-optical device for modulating light from the illumination system according to image information, and a projection system for projecting a modulated light beam obtained by the electro-optical device. The electro-optical device has a polarizer on at least one of the light incident side and the light emitting side, and the polarizer is attached to a flexible and transmissive plate material that bends in response to changes in shape of the polarizer. This makes it possible to reduce unevenness in brightness and color of images to be projected and displayed.

22 Claims, 12 Drawing Sheets

PROJECTOR COMPRISING A POLARIZER ATTACHED TO A TRANSMISSIVE FLEXIBLE PLATE MATERIAL THAT BENDS RESPONSIVE TO CHANGES IN THE SHAPE OF THE POLARIZER

BACKGROUND OF THE INVENTION

1. Field of Invention

The present invention relates to a projector for projecting and displaying images.

2. Description of Related Art

In a projector, light emitted from an illumination system is modulated by liquid crystal panels or the like according to image information (image signals), and the modulated light is projected onto a screen, thereby achieving image display.

FIG. 11 is an explanatory view showing the principal part of a conventional projector. The projector may consist of three liquid crystal light valves 900R, 900G, and 900B, a cross-dichroic prism 920, and a projection system 940. Colored light of the three colors, red (R), green (G), and blue (B) emitted from an illumination system (not shown) passes through the liquid crystal light valves 900R, 900G, and 900B, and is thereby modulated according to image information. The modulated light (modulated light beams) is synthesized by the cross-dichroic prism 920, and the synthesized light is projected by the projection system 940. A color image is thereby displayed on a screen SC.

The first liquid crystal light valve 900R includes a liquid crystal panel 901R, and two polarizers 902Ri and 902Ro attached to the light incident side and the light emitting side of the liquid crystal panel 901R, respectively. The first polarizer 902Ri on the light incident side transmits light polarized in the same direction as the polarization axis of incident light. Since it is assumed that light incident on the first polarizer 902Ri is polarized in almost the same direction as the polarization axis of the first polarizer 902Ri in FIG. 11, most of the incident light passes unchanged through the first polarizer 902Ri. The light which passed through the first polarizer 902Ri is converted into light polarized in a predetermined direction by the liquid crystal panel 901 R and the second polarizer 902Ro, and is then emitted. This also applies to the second and third liquid crystal light valves 900G and 900B.

SUMMARY OF THE INVENTION

When the liquid crystal light valve is irradiated with light emitted from the illumination system, in general, the polarizer in the liquid crystal light valve generates heat. In this case, the temperature of the polarizer sometimes increases to a temperature as high as approximately 80° C. This is because light which does not pass through the polarizer is absorbed by the polarizer. Since it is assumed that light polarized in almost the same direction as the polarization axis of the polarizer on the light incident side enters the liquid crystal light valves 900R, 900G, and 900B in FIG. 11, the polarizers 902Ri, 902Gi, and 902Bi on the light incident side generate a relatively small amount of heat. In contrast, since the polarizers 902Ro, 902Go, and 902Bo on the light emitting side transmit only light polarized in a predetermined direction of the light modulated by the liquid crystal panels, and absorb the light polarized in other directions, they generate a relatively large amount of heat. If a black image is displayed on the screen SC, the polarizers 902Ro, 902Go, and 902Bo on the light emitting side absorb most of the incident light, and therefore, they generate an enormous amount of heat.

When the polarizer thus generates heat, since it is attached to the liquid crystal panel, thermal stress is produced therein. Even when the polarizer is attached to a lens or a prism, thermal stress is similarly produced therein. FIG. 12 is a plan view of the second polarizer 902Ro attached to the light emitting side of the first liquid crystal panel 901R, as viewed from the −x-direction. Thermal stress inside the polarizer acts in the directions of the arrows in FIG. 12, and the polarizer becomes distorted due to thermal stress. While this distortion also depends on the intensity distribution of light incident on the polarizer, in general, the distortion is greatest particularly in areas enclosed by broken lines in FIG. 12, that is, at the four corners of the substantially rectangular polarizer 902Ro. When the polarizer is thus distorted, it cannot exhibit desired properties. That is, the polarizer 902Ro transmits the light to be shielded and shields the light to be transmitted. In this case, light emitted from the distorted portions of the polarizer is elliptically polarized, and the intensity of the light is sometimes higher or is sometimes lower than in a normal case in which linearly polarized light is emitted. It is believed that such a phenomenon occurs because the molecular structure of the polarizer undergoes distortion, and that it also depends on the arrangement of liquid crystal molecules which determines the polarizing direction of the light incident on the polarizer 902Ro. When thermal stress thus occurs in the polarizer 902Ro, modulated light beams emitted therefrom are uneven in intensity. Therefore, when a color image is displayed on the screen SC by synthesizing the modulated light beams, it is uneven in color. Similarly, when a monochrome image is displayed on the screen SC, it is uneven in brightness.

The present invention has been made to at least overcome the above problems in the conventional art. One exemplary object of the present invention is to provide a technique for at least reducing unevenness in brightness and color of images to be displayed by a projector.

A device in accordance with an exemplary embodiment of the present invention is a projector which may include:

an illumination system for emitting illumination light;

an electro-optical device for modulating light from the illumination system according to image information; and a projection system for projecting a modulated light beam obtained by the electro-optical device.

The electro-optical device of this exemplary embodiment preferably has a polarizer on at least one of the light incident side and the light emitting side, and the polarizer is preferably attached to a flexible and transmissive plate material that bends in response to changes in shape of the polarizer.

In the projector of this exemplary embodiment of the present invention, the polarizer is preferably attached to a flexible and transmissive plate material that bends in response to changes in shape of the polarizer. This can reduce unevenness in the intensity of light emitted from the polarizer. As a result, it is possible to reduce unevenness in brightness and color in displayed images.

In this specification, "flexibility" includes not only the bending property of a plate material, but also the property of returning to its initial shape.

In the above device, it is preferable that the plate material be held by a plate material holding section, and that the plate material holding section hold the substantially rectangular plate material so that the plate material can be bent at least at the four corners thereof.

When the plate material is held in this way, the substantially rectangular plate material can be easily bent at the four corners, at which relatively large deformations due to changes in shape of the polarizer are expected.

In the above device, it is preferable that the plate material holding section hold the plate material so that the plate material can move forward and backward in the traveling direction of light passing therethrough.

In this way, the plate material can be held so as to be bent more easily.

In the above device, it is preferable that the plate material holding section hold the plate material by elastically pressing the plate material inward at a side face thereof.

This makes it possible to hold the plate material according to the bending thereof.

Alternatively, in the above device, the plate material may be attached to a transmissive member via a gel adhesive.

Since this allows the gel adhesive to be deformed easily, the plate material can be held so as to be bent in response to changes in shape of the polarizer.

A device in accordance with another exemplary embodiment of the present invention is a projector for projecting and displaying a color image. The device may include:

an illumination system for emitting illumination light;

a colored light separating system for separating the illumination light emitted from the illumination system into first colored light, second colored light and third colored light having three color components;

first electro-optical device, second electro-optical device and third electro-optical device for respectively modulating the first colored light, the second colored light and the third colored light separated by the colored light separating system according to image information, and for thereby respectively generating first modulated light beam, second modulated light beam and third modulated light beam;

a color synthesizing section for synthesizing the first modulated light beam, the second modulated light beam and the third modulated light beam; and a projection system for projecting synthesized light emitted from the color synthesizing section.

In this exemplary embodiment, each of the first to third electro-optical devices preferably has a polarizer on at least one of the light incident side and the light emitting side, and the polarizer is attached to a flexible and transmissive plate material that bends in response to changes in shape of the polarizer.

In the projector of this exemplary embodiment, the polarizer is also preferably attached to a flexible and transmissive plate material that bends in response to changes in shape of the polarizer. Therefore, since it is possible to reduce unevenness in color of light emitted from the electro-optical devices, it is possible to reduce unevenness in color of an image to be displayed by the synthesized modulated light beak

DETAILED DESCRIPTION OF PREFERRED EMBODIMENTS

Figure 1:
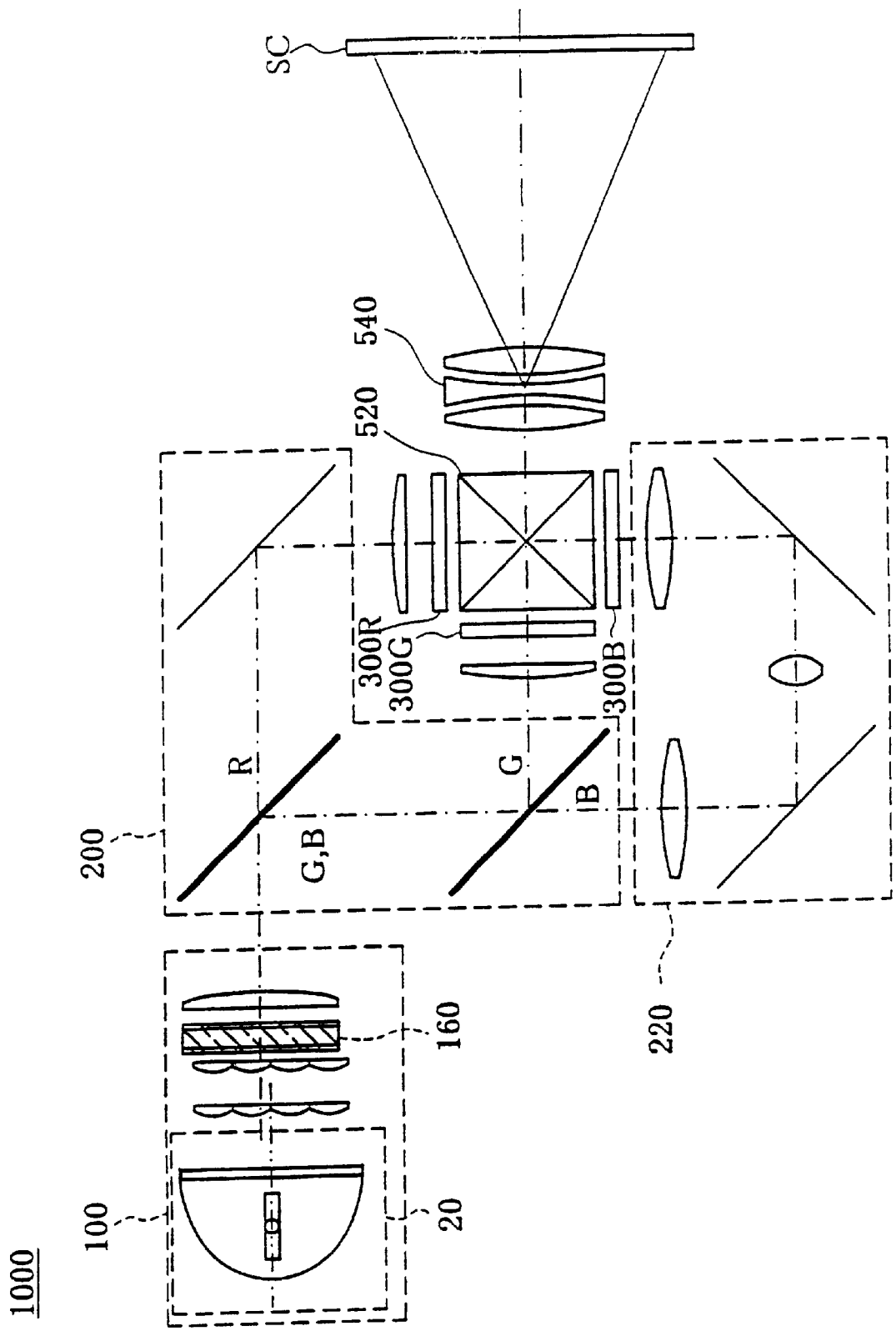
FIG. 1 is an explanatory view of a projector to which an exemplary embodiment of the present invention is applied.

The present invention will now be described with reference to an exemplary embodiment. FIG. 1 is an explanatory view of a projector to which an exemplary embodiment of the present invention is applied. A projector 1000 preferably consists of an illumination system 100, a colored light separating system 200, a relay system 220, three liquid crystal light valves 300R, 300G, and 300B, a cross-dichroic prism 520, and a projection system 540.

The illumination system 100 includes a polarized light generating system 160, converts light emitted from a light-source unit 20 into one type of linearly polarized light polarized in the same direction, and emits the linearly polarized light. Light emitted from the illumination system 100 is separated into three colored lights, red (R), green (G), and blue (B) by the colored light separating system 200. The separated colored lights are modulated by the liquid crystal valves 300R, 300G, and 300B according to image information (image signals). The three colored light beams modulated by the liquid crystal light valves 300R, 300G, and 300B are synthesized by the cross-dichroic prism 520, and are projected onto a screen SC by the projection system 540. Thereby, a color image is displayed on the screen SC. The structures and functions of the components of the projector shown in FIG. 1 have been described in detail in, for example, Japanese Unexamined Patent Application Publication No. 10-325954 disclosed by the present applicant, and therefore, a detailed description thereof is omitted in this specification.

Figure 2:
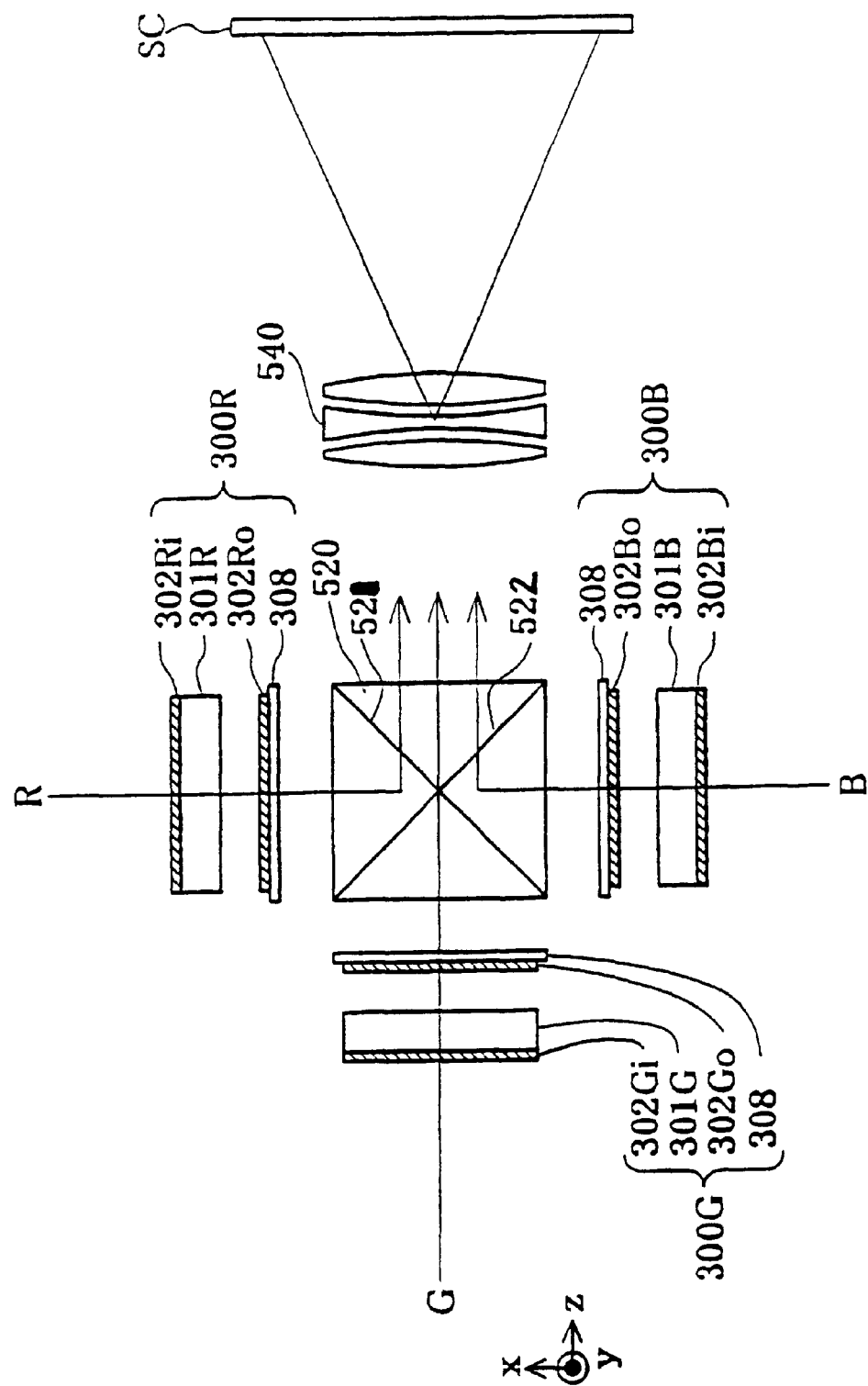
FIG. 2 is an explanatory view showing the principal part of the projector shown in FIG. 1.

FIG. 2 is an explanatory view showing the principal part of the projector 1000 shown in FIG. 1. FIG. 2 shows the three liquid crystal light valves 300R, 300G, and 300B and the cross-dichroic prism 520 shown in FIG. 1.

Colored lights R, G, and B enter the first to third liquid crystal light valves 300R, 300G, and 300B, respectively. A modulated light beam of the colored light R emitted from the first liquid crystal light valve 300R is reflected by a red light reflecting film 521 of the cross-dichroic prism 520, and a modulated light beam of the colored light B emitted from the third liquid crystal light valve 300B is reflected by a blue light reflecting film 522. In contrast, a modulated light beam of the colored light G emitted from the second liquid crystal light valve 300G passes through the two reflecting films 521 and 522 of the cross-dichroic prism 520. The three modulated light beams are thus synthesized, and a color image is displayed on the screen SC by the projection system 540. For convenience of illustration, the positions at which the red light and the blue light are reflected are displaced from the two reflecting films 521 and 522.

The first liquid crystal valve 300R includes a liquid crystal panel 301R, and two polarizers 302Ri and 302Ro disposed on the light incident side and the light emitting side of the liquid crystal panel 301R. The first polarizer 302Ri is attached to the liquid crystal panel 301R. In contrast, the second polarizer 302Ro is attached to a transmissive glass plate 308 at a distance from the liquid crystal panel 301R.

The colored light R to be incident on the first liquid crystal light valve 300R is linearly polarized light because it is emitted from the illumination system 100 (FIG. 1) having the polarized light generating system 160, as described above. The polarization axis of the first polarizer 302Ri disposed on the light incident side of the liquid crystal light valve 300R is set to coincide with the polarizing direction of the incident linearly polarized light. Therefore, most of the colored light R incident on the first polarizer 302Ri passes unchanged through the first polarizer 302Ri. The polarized light emitted from the first polarizer 302Ri is modulated by the liquid crystal panel 301R. The second polarizer 302Ro emits only the light polarized in the same direction as that of the polarization axis, of the light modulated by the liquid crystal panel 301R. The modulated light beam emitted from the second polarizer 302Ro passes through the glass plate 308, and enters the cross-dichroic prism 520.

Figure 11:
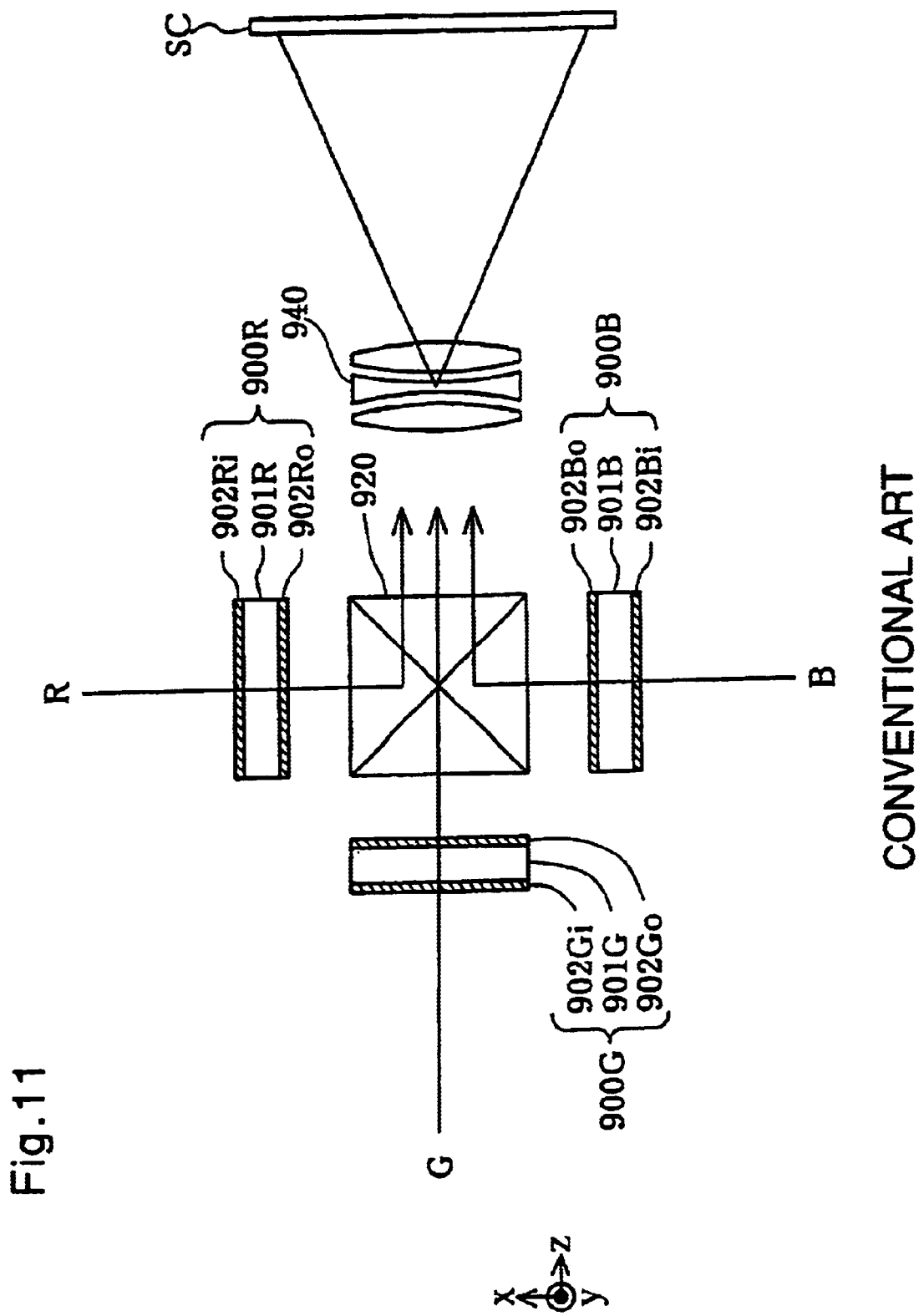
FIG. 11 is an explanatory view showing the principal part of a conventional projector.
Figure 12:
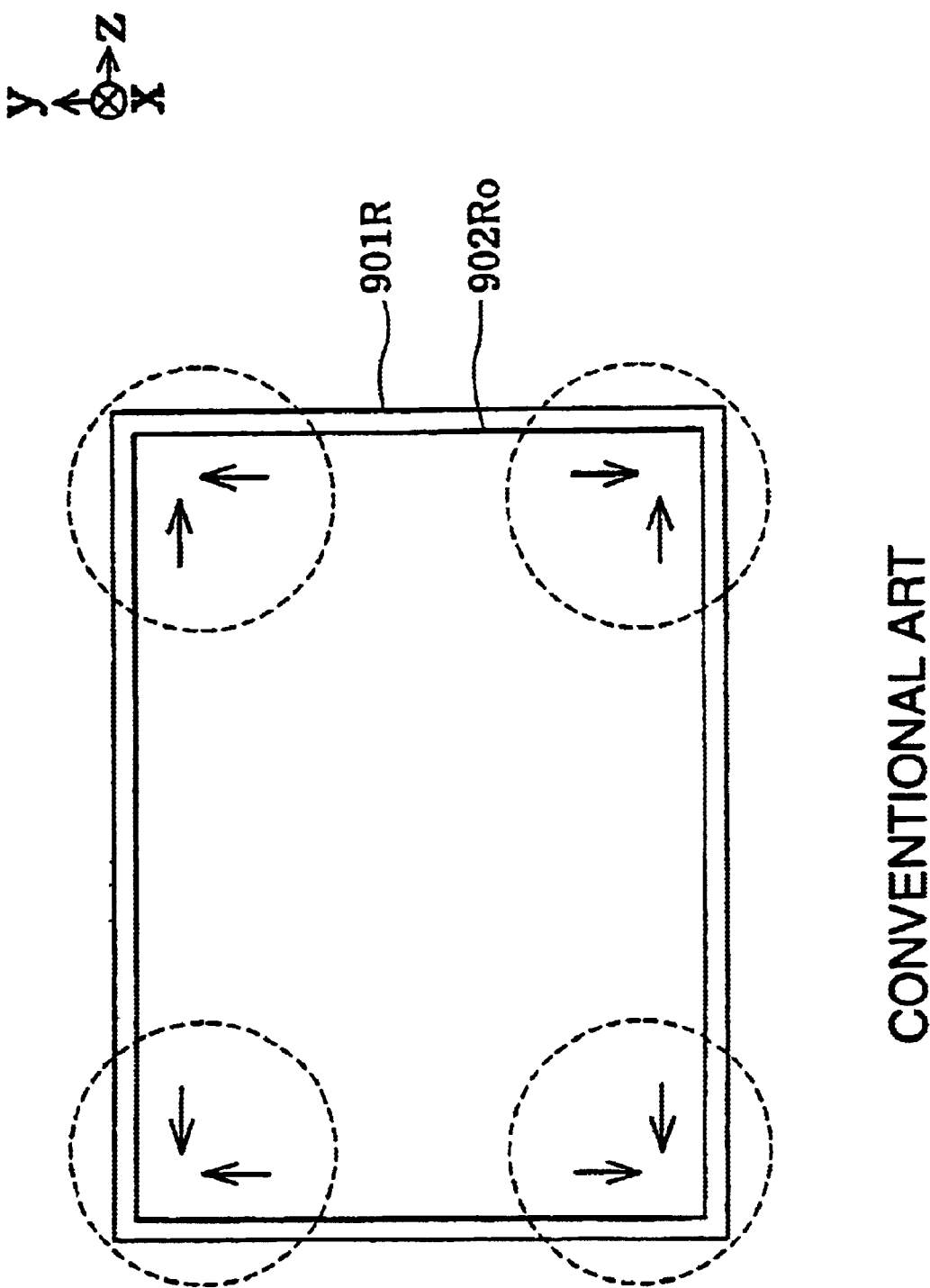
FIG. 12 is a plan view of a polarizer disposed on the light emitting side of a liquid crystal panel of FIG. 11, as viewed from the −x-direction.

While the second polarizer 902Ro in the conventional projector is attached to the liquid crystal panel 901R (or on a prism), as shown in FIG. 11, the second polarizer 302Ro in the projector of this embodiment is attached to the glass plate 308, which is relatively thin. This makes it possible to reduce unevenness in intensity of a modulated light beam emitted from the second polarizer 302Ro even when the second polarizer 302Ro generates heat, resulting in thermal stress. That is, since the relatively thin glass plate 308 is bent and straightens in response to changes in shape of the second polarizer 302Ro due to thermal stress, the thermal stress produced inside the second polarizer 302Ro can be substantially reduced. As a result, the second polarizer 302Ro can exhibit desired properties of transmitting the light which is to be transmitted, and of shielding the light which is to be shielded. Therefore, it is possible to reduce unevenness in intensity of a modulated light beam to be emitted. This also applies to the second and third liquid crystal light valves 300G and 300B. The following description will be given with particular attention to the third liquid crystal light valve 300B.

Figure 3:
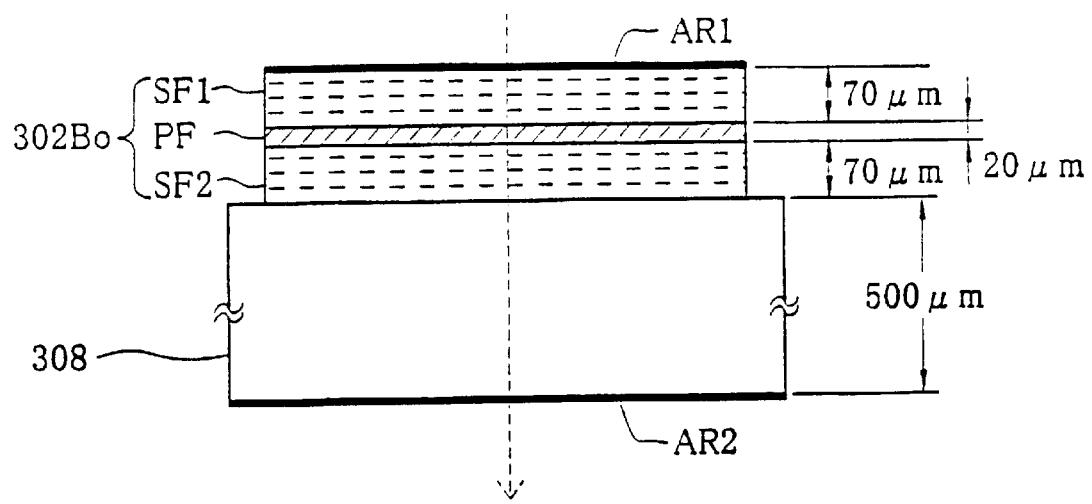
FIG. 3 is an enlarged cross-sectional view of an exemplary polarizer and an exemplary glass plate shown in FIG. 2.

FIG. 3 is an enlarged cross-sectional view of a second polarizer 302Bo and a glass plate 308 shown in FIG. 2. As is shown, the second polarizer 302Bo is attached to the glass plate 308. While an adhesive layer for bonding the polarizer 302Bo and the glass plate 308 is, in fact, interposed therebetween, this is not shown in FIG. 3.

The second polarizer 302Bo is composed of a polarizing film PF and two cellulose films SF1 and SF2 formed on the two sides of the polarizing film PF. The polarizing film PF is molded of polyvinyl alcohol (PVA), and is set to have a thickness of approximately 20 $\mu$m. The two cellulose films SF1 and SF2 are molded of triacetyl cellulose (TAC), and are set to have a thickness of approximately 70 $\mu$m. Therefore, the second polarizer 302Bo has a thickness of approximately 160 $\mu$m in total.

The glass plate 308 is formed of a white plate glass, and is set to have a thickness of approximately 500 $\mu$m. In this way, the glass plate 308 used has a thickness relatively larger than the thickness (approximately 160 $\mu$m) of the second polarizer 302Bo. Preferably, the glass plate 308 has a thickness such as to exhibit flexibility to be bent and straightened in response to changes in shape of the second polarizer 302Bo due to thermal stress. In a case in which a white plate glass is used for the above second polarizer 302Bo, flexibility appropriate to thermal stress produced inside the second polarizer 302Bo can be obtained by setting the thickness of the white plate glass at approximately 300 $\mu$m to approximately 500 $\mu$m.

Antireflection films AR1 and AR2 are formed on the incident surface of the second polarizer 302Bo and on the emitting surface of the glass plate 308. This allows most of the light incident on the second polarizer 302Bo to be guided into the second polarizer 302Bo, and allows most of the light passing through the glass plate 308 to emit from the glass plate 308.

As the glass plate 308, another kind of glass (inorganic glass) may be used instead of the white plate glass, or an organic glass, such as an acrylic plate, may be used. In general, this is satisfactory as long as the second polarizer 302Bo is attached to a flexible and transmissive plate material that bends in response to changes in shape of the second polarizer 302Bo. The use of an inorganic glass, such as a white plate glass, as in this embodiment provides higher heat resistance and makes it easier to form the antireflection film AR2 thereon.

Figure 4A:
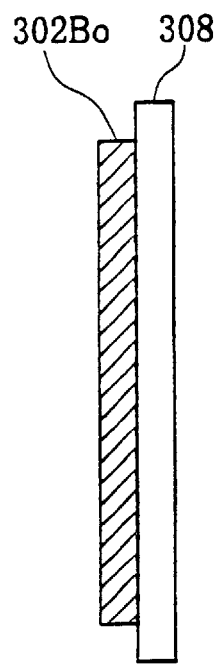
FIGS. 4(A)–(B) are conceptual views showing exemplary states in which the polarizer and the glass plate shown in FIG. 2 are bent.
Figure 4B:
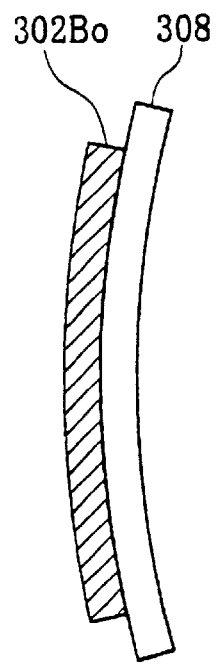

FIG. 4(A)–(B) are conceptual views showing exemplary states in which the second polarizer 302Bo and the glass plate 308 are bent. FIG. 4(A) shows the second polarizer 302Bo and the glass plate 308 when the temperature of the second polarizer 302Bo is relatively low, and FIG. 4(B) shows the second polarizer 302Bo and the glass plate 308 when the temperature of the second polarizer 302Bo is relatively high. As shown in FIGS. 4(A) and 4(B), when the second polarizer 302Bo generates heat and its temperature increases, it bows due to thermal stress produced therein. Thus, when the second polarizer 302Bo is attached to the flexible glass plate 308, since the glass plate 308 bends and straightens in response to changes in shape of the second polarizer 302Bo due to thermal stress, thermal stress inside the second polarizer 302Bo can be reduced. As a result, the second polarizer 302Bo can exhibit the desired properties of transmitting light which is to be transmitted and shielding light which is to be shielded, and this can reduce unevenness in intensity of emitted modulated light beams. Therefore, unevenness in color of a color image can be reduced by displaying the color image by synthesizing such modulated light beams.

As is seen from the above description, the first to third liquid crystal light valves 300R, 300G, and 300B in this embodiment respectively correspond to first and third electro-optical devices of the present invention. While the term "electro-optical device", in general, sometimes refers to an electro-optical device in the narrow sense that designates only a liquid crystal panel, it refers to an electro-optical device in the broad sense that includes a liquid crystal panel and a polarizer, in this specification.

Figure 5:
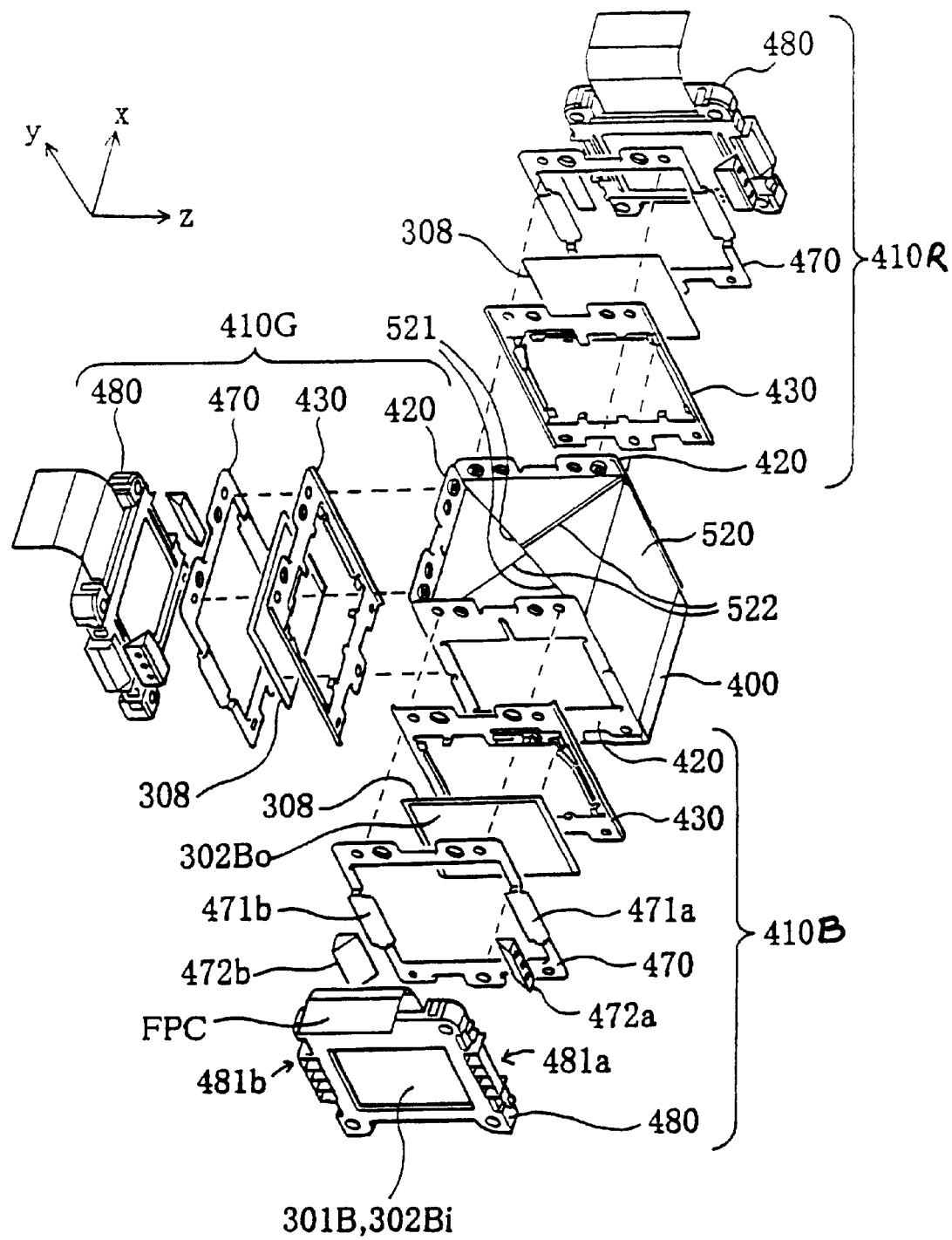
FIG. 5 is an explanatory view of an exemplary holding section for holding the glass plates of FIG. 2 with the polarizers attached thereto.

FIG. 5 is an explanatory view showing a holding section for holding the glass plates 308 to which the second polarizers 302Ro, 302Go and 302Bo are attached. In this embodiment, the glass plates 308 are held in the following manner in order to exhibit flexibility thereof.

FIG. 5 shows a state in which the three liquid crystal light valves 300R, 300G, and 300B are attached to the cross-dichroic prism 520 shown in FIG. 1. The holding section preferably consists of a prism fixing base 400 for fixing the cross-dichroic prism 520, and three valve holding sections 410R, 410G, and 410B for respectively holding the three liquid crystal light valves 300R, 300G, and 300B. The three light valve holding sections 410R, 410G, and 410B have the same structure, and each of them preferably consists of a valve mounting frame 420, first and second polarizer holding frames 430 and 470, and a panel holding frame 480. The following description will be given with attention to the third valve holding section 410B for holding the third liquid crystal light valve 300B.

The cross-dichroic prism 520 is fixed on the prism fixing base 400 shaped substantially like a square prism. The substantially rectangular valve mounting frame 420 is provided on a side face of the cross-dichroic prism 520, and is fixed to the prism fixing base 400. On the light incident side of the valve mounting frame 420, the first and second polarizer holding frames 430 and 470 of a substantially rectangular shape are placed with the glass plate 308 having the polarizer 302Bo attached thereto provided therebetween. The valve mounting frame 420 and the first and second polarizer holding frames 430 and 470 are fixed by screws via mounting holes formed therein, as shown by broken lines in FIG. 5. The second polarizer holding frame 470 has, on a pair of opposing sides, panel mounting portions 471a and 471b each serving as a relatively wide planar area. Wedge-shaped spacers 472a and 472b are fixedly bonded to the panel mounting portions 471a and 471b, respectively, and the panel holding frame 480 is mounted via the two spacers 472a and 472b. That is, the panel holding frame 480 has, on its light emitting side, engaging portions 481a and 481b to be engaged with the two spacers 472a and 472b, respectively, and is mounted on the second polarizer holding frame 470 by fixedly bonding the engaging portions 481a and 481b and the spacers 472a and 472b. The panel holding frame 480 holds the liquid crystal panel 301B (FIG. 2) with the first polarizer 302Bi attached to its light incident side. A flexible printed circuit board FPC is connected to the panel holding frame 480 so as to supply image signals to the liquid crystal panel 301 B. Light emitted from the liquid crystal panel 301B passes through openings inside the valve mounting frame 420 and the first and second polarizer holding frames 430 and 470, and enters the cross-dichroic prism 520.

Figure 6:
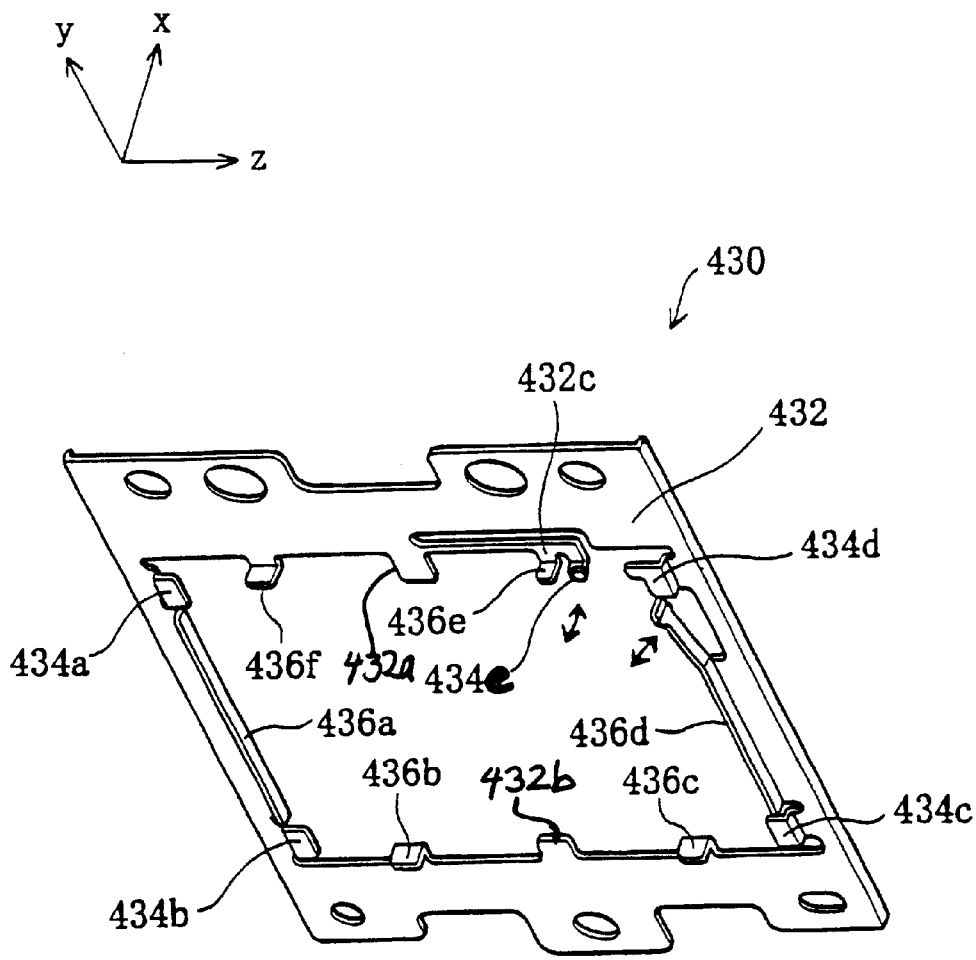
FIG. 6 is an enlarged explanatory view of an exemplary polarizer holding frame of FIG. 5.
Figure 7A:
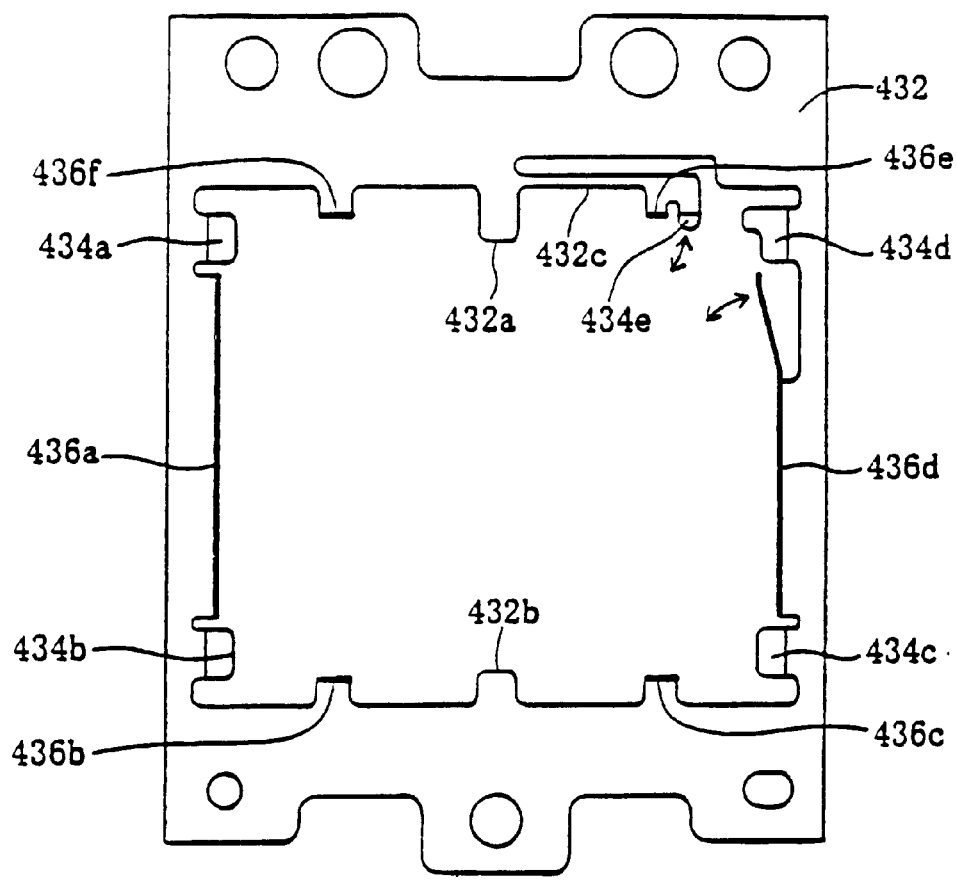
FIGS. 7(A)–(E) are plan views of the polarizer holding frame of FIG. 6, as viewed from various directions.
Figure 7B:
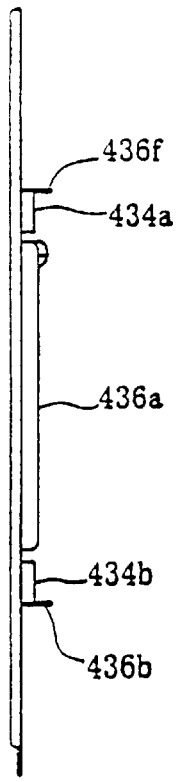
Figure 7C:
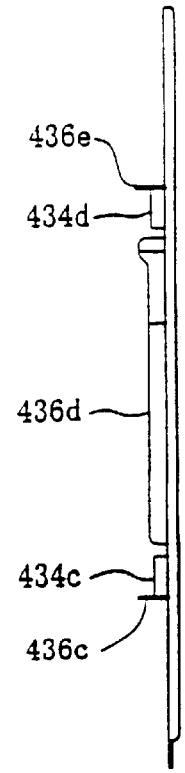
Figure 7D:
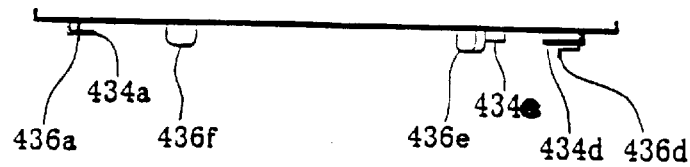
Figure 7E:
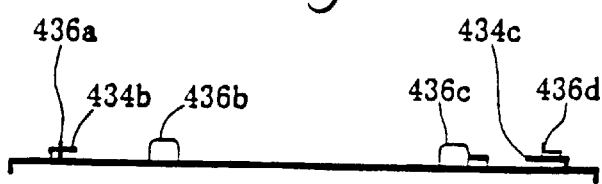

FIG. 6 is an enlarged explanatory view of the first polarizer holding frame 430 included in the third valve holding section 410B, as viewed from the same direction as that in FIG. 5. FIGS. 7(A)–(E) are plan views of the first polarizer holding frame 430, as viewed from various directions. FIG. 7(A) is a front view of the first polarizer holding frame 430, as viewed from the −x-direction. FIG. 7(B) is a side view, as shown from the −z-direction, and FIG. 7(C) is a side view, as shown from the +z-direction. Similarly, FIG. 7(D) is a side view, as shown from the +y-direction, and FIG. 7(E) is a side view, as viewed from the −y-direction. The following description will be given with attention to FIG. 7(A) as a front view.

As shown in FIGS. 6 and 7(A)–(E), the first polarizer holding frame 430 is substantially rectangular in outline, and it has a substantially rectangular opening therein. The first polarizer holding frame 430 is formed by variously shaping a flat metal plate and is integrally molded. A planar portion 432 of the polarizer holding frame 430 includes two projections 432a and 432b projecting vertically (in the y-direction), a key portion 432c shaped like a key, and a plurality of mounting holes formed on the periphery. The right and left (in the z-direction) ends of the planar portion 432 are bent toward the rear of the illustration (in the +x-direction).

The first polarizer holding frame 430 has five optical-axis-direction movement limiting portions 434a to 434e for limiting the movement of the glass plate 308 toward the rear of the illustration (in the +x-direction), that is, in the light traveling direction. The fifth optical-axis-direction movement limiting portion 434e is formed on the key portion 432c. The movement of the glass plate 308 toward the front of the illustration (in the −x-direction) is limited by the two relatively wide panel mounting portions 471a and 471b formed in the second polarizer holding frame 470 shown in FIG. 5. As is seen from the above description, the forward and backward movement of the glass plate 308 in the light traveling direction (in the ±x-direction) is limited to within a predetermined range of travel by the five optical-axis-direction movement limiting portions 434a to 434e and the two panel mounting portions 471a and 471b. The five optical-axis-direction movement limiting portions 434a to 434e and the two panel mounting portions 471a and 471b are planar areas formed in parallel with the planar portion 432.

The first polarizer holding frame 430 further has six vertical movement limiting portions 436a to 436f for limiting the movement in the y-direction and the z-direction orthogonal to the light traveling direction. The vertical movement limiting portions 436a to 436f are planar areas formed perpendicular to the planar portion 432.

The fourth vertical movement limiting portion 436d has a bent portion bent inward at one end. The fifth vertical movement limiting portion 436e is formed on the key portion 432c so as to project slightly offset inward from the sixth vertical movement limiting portion 436f. The key portion 432c and the bent portion of the fourth vertical movement limiting portion 436d serve as a pressing mechanism for elastically pressing the glass plate 308 to be mounted, and are easily bent and straightened in the directions of the arrows in FIG. 6.

Figure 8:
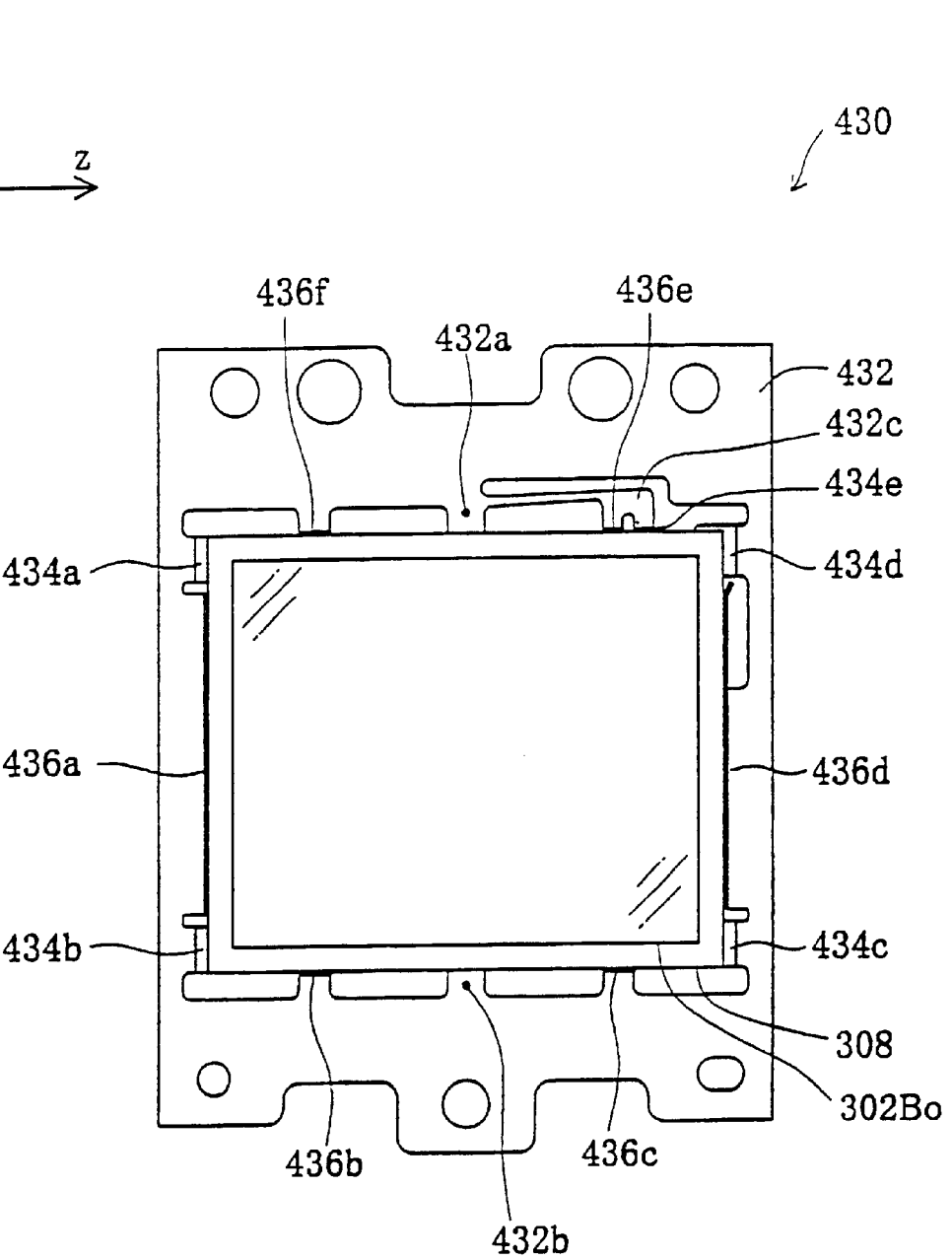
FIG. 8 is an explanatory view showing an exemplary state in which the glass plate of FIG. 2 is attached to the polarizer holding frame.

FIG. 8 is an explanatory view showing an exemplary state in which the glass plate 308 is attached to the first polarizer holding frame 430. In order to attach the glass plate 308 to the first polarizer holding frame 430, the glass plate 308 is placed on the first to fourth optical-axis-direction movement limiting portions 434a to 434d and the fifth optical-axis-direction movement limiting portion 434e formed on the key portion 432c. In this case, the glass plate 308 is placed inside an area surrounded by the six vertical movement limiting portions 436a to 436f. Thereby, the glass plate 308 is elastically pressed by the fifth vertical movement limiting portion 436e on the key portion 432c and the leading bent portion of the fourth vertical movement limiting portion 436d. The two projections 432a and 432b formed on the planar portion 432 do not contribute to the holding of the glass plate 308.

The glass plate 308 thus attached to the first polarizer holding frame 430 is mounted on the valve mounting frame 420 (FIG. 5) while being sandwiched between the first and second polarizer holding frames 430 and 470. In this case, the movement of the glass plate 308 in the x-direction is limited to within a predetermined range of travel by the five optical-axis-direction movement limiting portions 434a to 434e formed on the first polarizer holding frame 430 and the two panel mounting portions 471a and 471b formed on the second polarizer holding frame 470, as described above.

Figure 9:
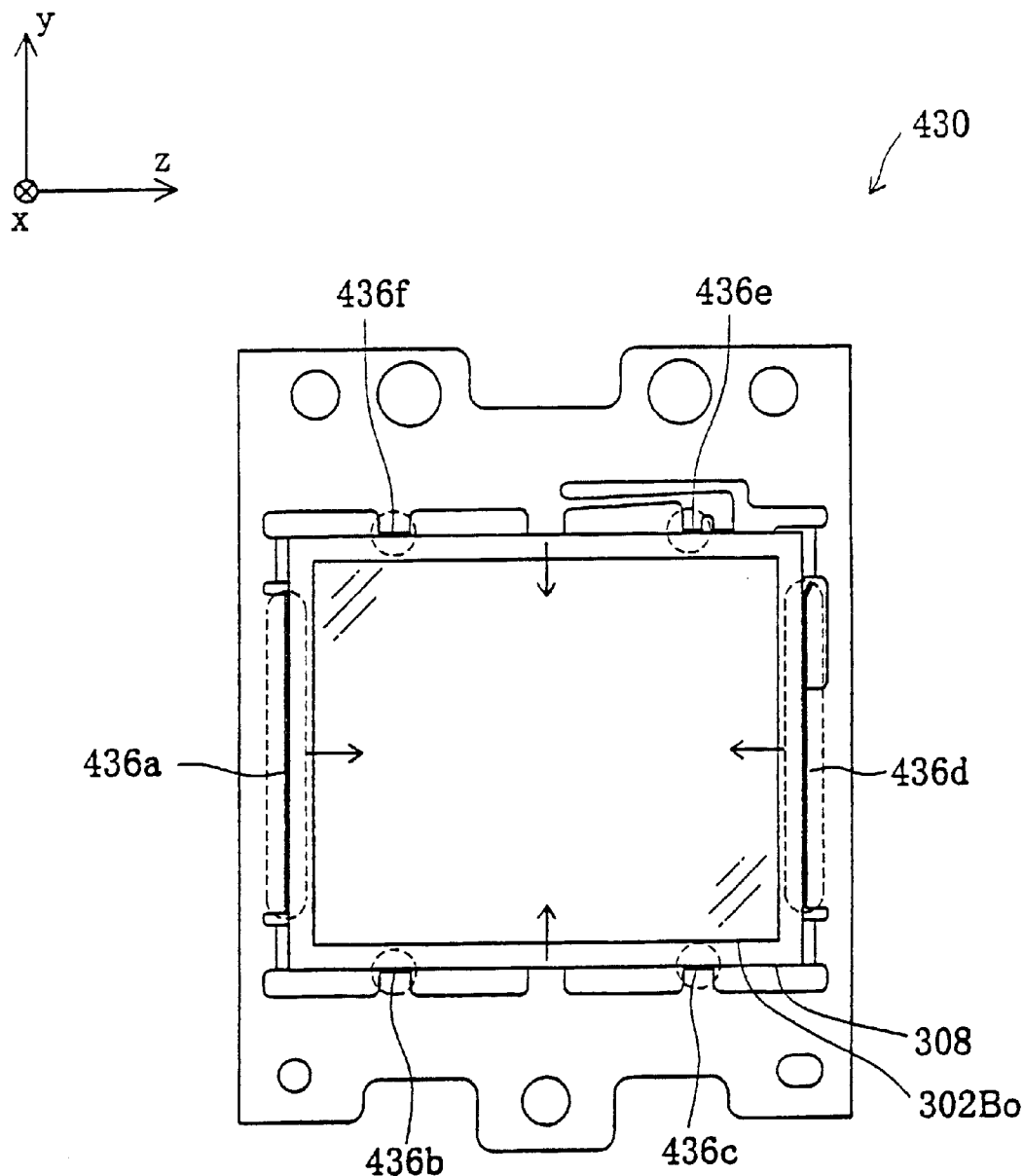
FIG. 9 is an explanatory view showing an exemplary state in which the glass plate of FIG. 2 sandwiched between first and second polarizer holding frames is pressed.

FIG. 9 is an explanatory view showing an exemplary state in which the glass plate 308 sandwiched between the first and second polarizer holding frames 430 and 470 is pressed. The glass plate 308 is pressed at six points enclosed by broken lines in FIG. 9. That is, the glass plate 308 is pressed in the horizontal direction (in the z-direction) by the first and fourth vertical movement limiting portions 436a and 436d, and in the vertical direction (in the y-direction) by the second, third, fifth, and sixth vertical movement limiting portions 436b, 436c, 436e, and 436f.

As shown in FIG. 9, the substantially rectangular glass plate 308 is not pressed at the four corners in this embodiment. By being held in this way, the glass plate 308 can be easily bent at the four corners, at which substantial changes in shape due to thermal stress in the polarizer 302Bo are anticipated.

As described above, since the glass plate 308 is sandwiched between the first and second polarizer holding frames 430 and 470, it can move forward and backward in the light traveling direction within a predetermined range of travel. This allows the glass plate 308 to be bent more easily than in a case in which the glass plate cannot move.

Furthermore, the glass plate 308 is held by being elastically pressed inward at the centers of the sides. This allows the glass plate 308 to be held in accordance with the bending thereof.

As is seen from the above description, the first and second polarizer holding frames 430 and 470 in this embodiment correspond to a plate material holding section of this invention.

FIGS. 10(A)–(B) are explanatory views showing another exemplary method for holding a flexible glass plate 308. Referring to FIGS. 10(A)–(B), the glass plate 308 is held by being bonded to a gel adhesive 492. That is, the glass plate 308 with a second polarizer 302Bo attached thereto is bonded to a second transmissive glass plate 490 via the gel adhesive 492.

FIG. 10(A) shows the second polarizer 302Bo and the glass plate 308 when the temperature of the second polarizer 302Bo is relatively low, and FIG. 10(B) shows the second polarizer 302Bo and the glass plate 308 when the temperature of the second polarizer 302Bo is relatively high. When the glass plate 308 is held by using the gel adhesive 492, as is illustrated, it can be easily bent and straightened in response to changes in shape of the second polarizer 302Bo because the gel adhesive 492 deforms easily. As the gel adhesive 492, a gel adhesive that can appropriately transmit light emitted from the second polarizer 302Bo is preferable. For example, an adhesive may be used which is formed by mixing two kinds of solutions JCR6119A and JCR6119B, sold by Dow Corming Toray Silicone Co., Ltd., in equal proportions, and by gelling the mixture.

Figure 10:
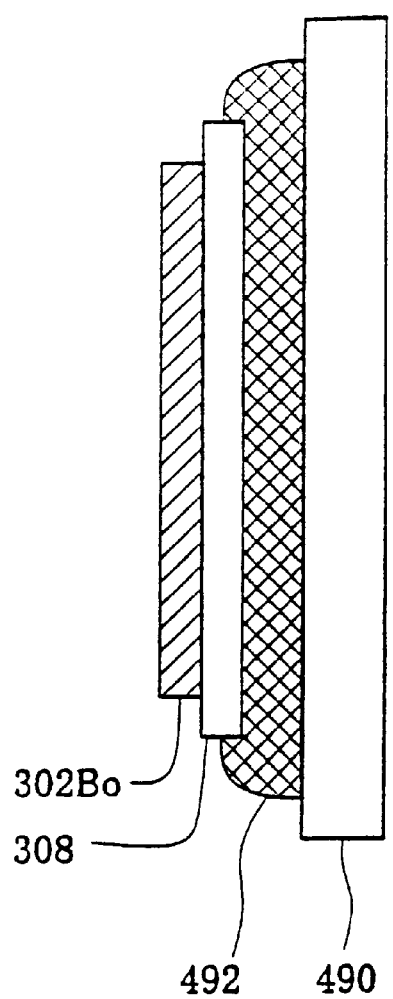
FIGS. 10(A)–(B) are explanatory views showing another exemplary method for holding the flexible glass plate of FIG. 2.
Figure 10:
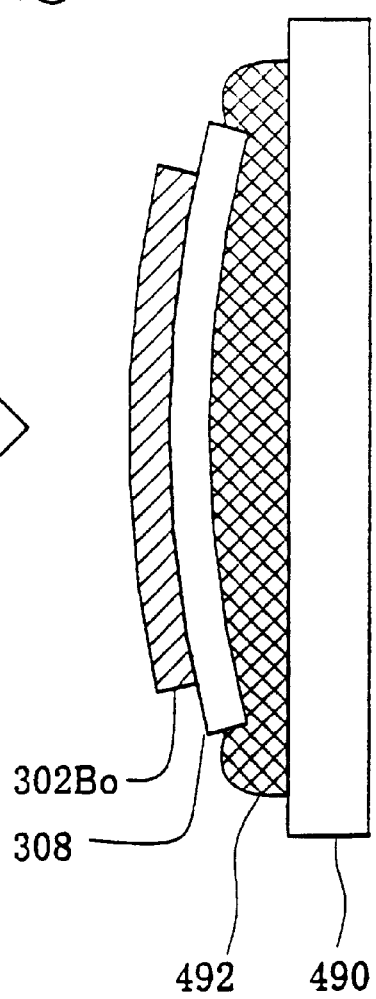

While the glass plate 308 with the second polarizer 302Bo attached thereto is bonded to the second glass plate 490 via the gel adhesive 492 in FIG. 10, it may be instead bonded to the cross-dichroic prism 520. This can obviate the need for the second glass plate 490. In general, this is satisfactory as long as the glass plate 308 with the second polarizer 302Bo attached thereto is bonded to a transmissive member via a gel adhesive.

As described above, the second polarizers 302Ro, 302Go and 302Bo in the present invention are bonded to flexible and transmissive plate materials that bend in response to changes in shape of the second polarizers 302Ro, 302Go and 302Bo due to thermal stress. This allows the second polarizers 302Ro, 302Go and 302Bo to emit light that is uniform in intensity. Therefore, by synthesizing modulated light beams of three colors emitted from the second polarizers 302Ro, 302Go and 302Bo, it is possible to display a color image, which is uniform in color, onto the screen SC.

While the projector 1000 for displaying a color image is described as an example in the above embodiments, this similarly applies to a projection display for displaying a monochrome image. That is, since light, which is uniform in color, is emitted from polarizers in the projector for displaying a monochrome image, it is possible to display a monochrome image, which is uniform in brightness, onto the screen.

The present invention is not limited to the above embodiments and modes, and can be carried out in various modes without departing from the scope of the invention. For example, the following modifications are possible.

(1) While only the second polarizers 302Ro, 302Go, and 302Bo disposed on the light emitting sides of the liquid crystal light valves 300R, 300G, and 300B are attached to the flexible glass plates 308 in the above embodiments, as shown in FIG. 2, the first polarizers 302Ri, 302Gi, and 302Bi disposed on the light incident sides may also be attached to flexible glass plates. By doing this, the first polarizers 302Ri, 302Gi, and 302Bi can cause the light which was linearly polarized to a high degree of polarization to enter the liquid crystal light panels 301R, 301G, and 301 B.

While the projector 1000 includes the illumination system 100 for emitting linearly polarized light in the above embodiments, it may include an illumination system for emitting uniform light instead. In this case, it is preferable that the first polarizers 302Ri, 302Gii and 302Bi disposed on the light incident sides be attached to flexible glass plates because they generate more heat. Since the light incident on the first polarizers 302Ri, 302Gi and 302Bi on the light incident sides can be effectively used by using the illumination system 100 for emitting linearly polarized light as in the above embodiments, a bright image can be displayed on the screen SC. Since the first polarizers 302Ri, 302Gi and 302Bi on the light incident sides are provided to enhance the degree of polarization of incident linearly polarized light, they may be omitted.

As is seen from the above description, the present invention is applicable to a projector in which a polarizer is disposed on one of the light incident side and the light emitting side of an electro-optical device.

(2) While the glass plate 308 with the second polarizer 302Ro, 302Go and 302Bo attached thereto is held by being elastically pressed inward at the centers of the sides by the first and second polarizer holding frames 430 and 470 serving as the plate material holding section in the above first embodiment, it may also be held by other methods. For example, the glass plate 308 may be held by being firmly pressed at the centers of the sides. In this case, the glass plate 308 is easily bent at the four corners thereof. In general, this is satisfactory as long as the plate material holding section holds the substantially rectangular plate material so that the plate material can be bent at least at the four corners. In such a case in which the plate material is held by another method, it is preferable that the plate material holding section hold the plate material so that the plate material can move forward and backward in the traveling direction of light passing therethrough, as described in the first embodiment. Furthermore, it is preferable that the plate material holding section hold the plate material by elastically pressing the plate material inward at the centers of the sides thereof.

(3) While light polarized in a predetermined direction is emitted from the polarizers by attaching the polarizers on the flexible glass plates 308 in the above embodiments, as shown in FIGS. 5 and 10, in addition, a cooling device for forcibly cooling the polarizers may be used. For example, the polarizers attached to the glass plates may be cooled by a cooling fan. The polarizers may be cooled by placing the glass plates with the polarizers stuck thereon in a liquid and circulating the liquid between the glass plates and a heat exchanger. Alternatively, the polarizers may be cooled by contacting a Peltier device with the corners of the polarizers and the glass plates. By using such cooling devices, light polarized in a predetermined direction can be easily emitted from the polarizers. When forcible cooling is conducted as described above, the entire liquid crystal light valves may be cooled instead of cooling only the polarizers.

(4) While the present invention is applied to a transmissive projector as an example in the above description, it is also applicable to a reflective projector. Herein, "transmissive" means that an electro-optical device serving as a light modulation device is of a type for transmitting light, as in a transmissive liquid crystal panel, and "reflective" means that an electro-optical device serving as a light modulation device is of a type for reflecting light, as in a reflective liquid crystal panel. When the present invention is applied to a reflective projector, nearly the same advantages as those in the transmissive projector can be obtained.

What is claimed is:

1. A projector, comprising:

an illumination system that emits illumination light;

an electro-optical device that modulates light emitted from said illumination system according to image information; and a projection system that projects a modulated light beam obtained by said electro-optical device, said electro-optical device comprising a polarizer on at least one of a light incident side and a light emitting side, and said polarizer being attached to a flexible and transmissive glass plate material that bends in response to changes in shape of said polarizer and that reduces unevenness in intensity of the modulated light beam.

2. The projector according to claim 1, said plate material having a substantially rectangular shape and being held by a plate material holding section, and said plate material holding section holding the plate material so that said plate material can be bent at least at four corners of the plate material.

3. The projector according to claim 2, said plate material holding section holding said plate material so that said plate material can move forward and backward in a traveling direction of light passing therethrough.

4. The projector according to claim 3, said plate material holding section holding said plate material by elastically pressing said plate material inward at a side face thereof.

5. The projector according to claim 1, said plate material being attached to a transmissive member via a gel adhesive.

6. A projector that projects and displays a color image, said projector comprising:

an illumination system that emits illumination light;

a colored light separating system that separates the illumination light emitted from said illumination system into first colored light, second colored light and third colored light having three color components;

first electro-optical device, second electro-optical device and third electro-optical device that respectively modulates the first colored light, the second colored light and the third colored light separated by said colored light separating system according to image information, and thereby respectively generating first modulated light beam, second modulated light beam and third modulated light beam;

a color synthesizing section that synthesizes said first modulated light beam, said second modulated light beam and said third modulated light beam; and a projection system that projects synthesized light emitted from said color synthesizing section, each of said first electro-optical device, said second electro-optical device and said third electro-optical device comprising a polarizer on at least one of light incident side and a light emitting side, and said polarizer being attached to a flexible and transmissive glass plate material that bends in response to changes in shape of said polarizer and that reduces unevenness in intensity of the modulated light beam.

7. The projector according to claim 6, said plate material having a substantially rectangular shape and being held by a plate material holding section, and said plate material holding section holding the plate material so that said plate material can be bent at least at four corners of the plate material.

8. The projector according to claim 7, said plate material holding section holding said plate material so that said plate material can move forward and backward in a traveling direction of light passing therethrough.

9. The projector according to claim 8, said plate material holding section holding said plate material by elastically pressing said plate material inward at a side face thereof.

10. The projector according to claim 6, said plate material being attached to a transmissive member via a gel adhesive.

11. A projector, comprising:

an illumination system that emits illumination light;

an electro-optical device that modulates light emitted from said illumination system according to image information; and a projection system that projects a modulated light beam obtained by said electro-optical device, said electro-optical device comprising an electro-optical panel and a polarizer disposed on at least one of a light incident side and a light emitting side of said electro-optical panel, said polarizer being attached to a flexible and transmissive plate material that bends in response to changes in shape of said polarizer, said polarizer and said plate material being separated from said electro-optical panel by at least an amount necessary to allow said plate material to bend.

12. The projector according to claim 11, said plate material having a substantially rectangular shape and being held by a plate material holding section, and said plate material holding section holding the plate material so that said plate material can be bent at least at four corners of the plate material.

13. The projector according to claim 12, said plate material holding section holding said plate material so that said plate material can move forward and backward in a traveling direction of light passing therethrough.

14. The projector according to claim 13, said plate material holding section holding said plate material by elastically pressing said plate material inward at a side face thereof.

15. The projector according to claim 11, said plate material being attached to a transmissive member via a gel adhesive.

16. A projector according to claim 11, said plate material being made of glass.

17. A projector that projects and displays a color image, said projector comprising:

an illumination system that emits illumination light;

a colored light separating system that separates the illumination light emitted from said illumination system into first colored light, second colored light and third colored light having three color components;

first electro-optical device, second electro-optical device and third electro-optical device that respectively modulates the first colored light, the second colored light and the third colored light separated by said colored light separating system according to image information, and thereby respectively generating first modulated light beam, second modulated light beam and third modulated light beam;

a color synthesizing section that synthesizes said first modulated light beam, said second modulated light beam and said third modulated light beam; and a projection system that projects synthesized light emitted from said color synthesizing section, each of said first electro-optical device, said second electro-optical device and said third electro-optical device comprising an electro-optical panel and a polarizer disposed on at least one of light incident side and a light emitting side of said electro-optical panel, said polarizer being attached to a flexible and transmissive plate material that bends in response to changes in shape of said polarizer, said polarizer and said plate material being separated from said electro-optical panel by at least an amount necessary to allow said plate material to bend.

18. The projector according to claim 17, said plate material having a substantially rectangular shape and being held by a plate material holding section, and said plate material holding section holding the plate material so that said plate material can be bent at least at four corners of the plate material.

19. The projector according to claim 18, said plate material holding section holding said plate material so that said plate material can move forward and backward in a traveling direction of light passing therethrough.

20. The projector according to claim 19, said plate material holding section holding said plate material by elastically pressing said plate material inward at a side face thereof.

21. The projector according to claim 17, said plate material being attached to a transmissive member via a gel adhesive.

22. The projector according to claim 17, said plate material being made of glass.

\* \* \* \* \*